| (12) | United States Patent | (10) Patent No.: | US 9,301,197 B2 |
|---|---|---|---|
| | Noh et al. | (45) Date of Patent: | *Mar. 29, 2016 |

(54) METHOD FOR TRANSMITTING PPDU IN WIRELESS LOCAL AREA NETWORK AND APPARATUS FOR THE SAME

(71) Applicant: LG ELECTRONICS INC., Seoul (KR)

(72) Inventors: Yu Jin Noh, Anyang-si (KR); Dae Won Lee, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/820,239

(22) Filed: Aug. 6, 2015

(65) Prior Publication Data

US 2015/0350951 A1 Dec. 3, 2015

Related U.S. Application Data

(63) Continuation of application No. 14/492,975, filed on Sep. 22, 2014, now Pat. No. 9,113,361, which is a continuation of application No. 13/082,025, filed on Apr. 7, 2011, now Pat. No. 8,873,582.

(60) Provisional application No. 61/322,271, filed on Apr. 8, 2010.

(51) Int. Cl.
 *H04W 4/00* (2009.01)
 *H04W 28/06* (2009.01)
 *H04W 84/12* (2009.01)

(52) U.S. Cl.
 CPC ............ *H04W 28/065* (2013.01); *H04W 84/12* (2013.01)

(58) Field of Classification Search
 CPC .... H04W 28/065; H04L 5/0023; H04L 5/005
 See application file for complete search history.

(56) References Cited

U.S. PATENT DOCUMENTS

| 6,598,200 | B1 | 7/2003 | Greenwood et al. |
|---|---|---|---|
| 8,462,702 | B2 | 6/2013 | Jax et al. |
| 2004/0014447 | A1 | 1/2004 | Hepler et al. |
| 2004/0151109 | A1 | 8/2004 | Batra et al. |
| 2005/0135493 | A1 | 6/2005 | Maltsev et al. |
| 2005/0180315 | A1 | 8/2005 | Chitrapu et al. |
| 2005/0195733 | A1 | 9/2005 | Walton et al. |
| 2005/0226271 | A1 | 10/2005 | Ko et al. |
| 2008/0285670 | A1 | 11/2008 | Walton et al. |
| 2011/0026623 | A1 | 2/2011 | Srinivasa et al. |
| 2011/0134900 | A1 | 6/2011 | Liu et al. |
| 2011/0150004 | A1 | 6/2011 | Denteneer et al. |
| 2011/0194475 | A1 | 8/2011 | Kim et al. |
| 2014/0078966 | A1 | 3/2014 | Erceg. et al. |

*Primary Examiner* — Brian J Gillis
*Assistant Examiner* — Michael A Keller
(74) *Attorney, Agent, or Firm* — Lee, Hong, Degerman, Kang & Waimey

(57) ABSTRACT

A method and device for receiving a data block in a wireless communication system, the method performed by a receiver. The method includes: receiving a physical layer protocol data unit (PPDU) from a transmitter over an operating channel, the PPDU including a signal field, a Very High Throughput-Signal-A (VHT-SIG-A) field, a Very High Throughput-Signal-B (VHT-SIG-B) field and a padded data block, generating a first data block by removing zero or more physical padding bits from the padded data block in a physical layer; and generating a second data block by removing zero or more Medium Access Control (MAC) padding bits from the first data block in a MAC layer.

8 Claims, 9 Drawing Sheets

METHOD FOR TRANSMITTING PPDU IN WIRELESS LOCAL AREA NETWORK AND APPARATUS FOR THE SAME

CROSS-REFERENCE TO RELATED APPLICATIONS

This application is a continuation of U.S. patent application Ser. No. 14/492,975, filed on Sep. 22, 2014, now U.S. Pat. No. 9,113,361, which is a continuation of U.S. patent application Ser. No. 13/082,025, filed on Apr. 7, 2011, now U.S. Pat. No. 8,873,582, which claims the benefit of U.S. Provisional Patent Application No. 61/322,271, filed on Apr. 8, 2010, the contents of which are hereby incorporated by reference herein in its entirety.

BACKGROUND OF THE INVENTION

1. Field of the Invention

The present invention relates to a wireless local area network (WLAN) system, and more particularly, to a method and apparatus for transmitting a physical layer convergence procedure (PLCP) protocol data unit (PPDU).

2. Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted.

In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate. In addition, this standard may use a coding scheme which transmits several duplicate copies to increase data reliability and also may use the OFDM to support a higher data rate.

An IEEE 802.11n HT WLAN system employs an HT green field physical layer convergence procedure (PLCP) protocol data unit (PPDU) format which is a PPDU format designed effectively for an HT station (STA) and which can be used in a system consisting of only HT STAs supporting IEEE 802.11n in addition to a PPDU format supporting a legacy STA. In addition, an HT-mixed PPDU format which is a PPDU format defined such that a system in which the legacy STA and the HT STA coexist can support an HT system.

With the widespread use of a wireless local area network (WLAN) and the diversification of applications using the WLAN, there is a recent demand for a new WLAN system to support a higher throughput than a data processing rate supported by the IEEE 802.11n. A next generation WLAN system supporting a very high throughput (VHT) is a next version of the IEEE 802.11n WLAN system, and is one of IEEE 802.11 WLAN systems which have recently been proposed to support a data processing rate of 1 Gbps or higher in a medium access control (MAC) service access point (SAP).

The next generation WLAN system allows simultaneous channel access of a plurality of VHT-STAs for the effective use of a radio channel. For this, a multi-user multiple input multiple output (MU-MIMO)-based transmission using multiple antennas is supported. A VHT-access point (AP) can perform spatial division multiple access (SDMA) transmission for transmitting spatial-multiplexed data to the plurality of VHT-STAs. When data is simultaneously transmitted by distributing a plurality of spatial streams to the plurality of STAs by the use of a plurality of antennas, an overall throughput of the WLAN system can be increased.

When using the MU-MIMO transmission method for transmitting data simultaneously with respect to the plurality of VHT-STAs, a physical layer convergence procedure (PLCP) protocol data unit (PPDU) including data intended to be transmitted to the plurality of VHT-STAs paired with the VHT-AP is transmitted through orthogonal frequency division multiplexing (OFDM) symbols, and the number of OFDM symbols is identical for each VTH-STA. However, a size of data intended to be transmitted to each VHT-STA may differ. Therefore, there is a need for a method for generating and transmitting a PPDU in such a manner that a specific padding bit is appended according to a size of data transmitted to a VHT-STA so that PPDUs to be transmitted to a plurality of STAs have the same bit size and thus are transmitted through the same number of OFDM symbols.

SUMMARY OF THE INVENTION

The present invention provides a method and apparatus for transmitting a physical layer convergence procedure (PLCP) protocol data unit (PPDU) in a wireless local area system (WLAN) system.

In an aspect, a method of transmitting a data block in a wireless communication system is provided. The method includes generating a data block used for multi-user transmission, the data block comprising a first control field and a data field for a plurality of users, the first control field indicating multi-user transmission of the data block, the data field comprising a plurality of data units, each data unit comprising a PSDU (PLCP (Physical Layer Convergence Procedure) Service Data Unit) for each user and padding bits which are appended to the PSDU for each user; and transmitting the data block to the plurality of users; wherein the number of the padding bits in each data unit is determined so that lengths of the plurality of data units are same and the number of the padding bits in each data unit is determined by $N_{sym}$, $N_{DBPS,k}$, $N_{PSDU,k}$, where $N_{sym}$ denotes the number of OFDM symbols of the data field, $N_{DBPS,k}$ denotes the number of data bits per OFDM symbol for k-th user, and the $N_{PSDU,k}$ denotes the length of the PSDU for k-th user.

Each data unit may further includes a service field indicating a scramble sequence used for scambling the PSDU for each user and the padding bits, and the number of the padding bits in each data unit is determined by $N_{sym}$, $N_{DBPS,k}$, $N_{PSDU,k}$, where $N_{service}$ denotes a length of the service field.

Each data unit may further includes a tail field indicating tail bits used for encoding the data field.

The value of $N_{sym}$ may be same for the plurality of users.

The method may further include determining a number of OFDM symbols $N_{sym,k}$ used for transmission of a PSDU for k-th user; and selecting a maximum value among the plurality of $N_{sym,k}$ as the $N_{sym}$.

The number of the padding bits may be between 0 and 7 inclusive.

The data block may further include plurality of second control field for the plurality of users, each second control field indicating a length of the PSDU for each user.

The data block may be a PPDU (PLCP Protocol Data Unit).

In another aspect, a wireless apparatus is provided. The apparatus includes a processor; and a transceiver operationally coupled to the processor to transmit and receive a data block, wherein the processor is configured for: generating a data block used for multi-user transmission, the data block comprising a first control field and a data field for a plurality of users, the first control field indicating multi-user transmission of the data block, the data field comprising a plurality of data units, each data unit comprising a PSDU (PLCP (Physical Layer Convergence Procedure) Service Data Unit) for each user and padding bits which are appended to the PSDU for each user; and transmitting the data block to the plurality of users; wherein the number of the padding bits in each data unit is determined so that lengths of the plurality of data units are same and the number of the padding bits in each data unit is determined by $N_{sym}$, $N_{DBPS,k}$, $N_{PSDU,k}$, where $N_{sym}$ denotes the number of OFDM symbols of the data field, $N_{DBPS,k}$ denotes the number of data bits per OFDM symbol for k-th user, and the $N_{PSDU,k}$ denotes the length of the PSDU for k-th user.

DESCRIPTION OF EXEMPLARY EMBODIMENTS

Hereinafter, embodiments of the present invention will be described in detail with reference to the accompanying drawings.

A wireless local area network (WLAN) system according to an embodiment of the present invention includes at least one basic service set (BSS). The BSS is a set of stations (STAs) successfully synchronized to communicate with one another. The BSS can be classified into an independent BSS (IBSS) and an infrastructure BSS.

The BSS includes at least one STA and an access point (AP). The AP is a functional medium for providing a connection to STAs in the BSS through respective wireless media. The AP can also be referred to as other terminologies such as a centralized controller, a base station (BS), a scheduler, etc.

The STA is any functional medium including a medium access control (MAC) and wireless-medium physical layer (PHY) interface satisfying the institute of electrical and electronics engineers (IEEE) 802.11 standard. The STA may be an AP or a non-AP STA. Hereinafter, the STA refers to the non-AP STA unless specified otherwise.

The STA can be classified into a very high throughput (VHT)-STA, a high throughput (HT)-STA, and a legacy (L)-STA. The HT-STA is an STA supporting IEEE 802.11n. The L-STA is an STA supporting a previous version of IEEE 802.11n, for example, IEEE 802.11a/b/g. The L-STA is also referred to as a non-HT STA.

Figure 1:
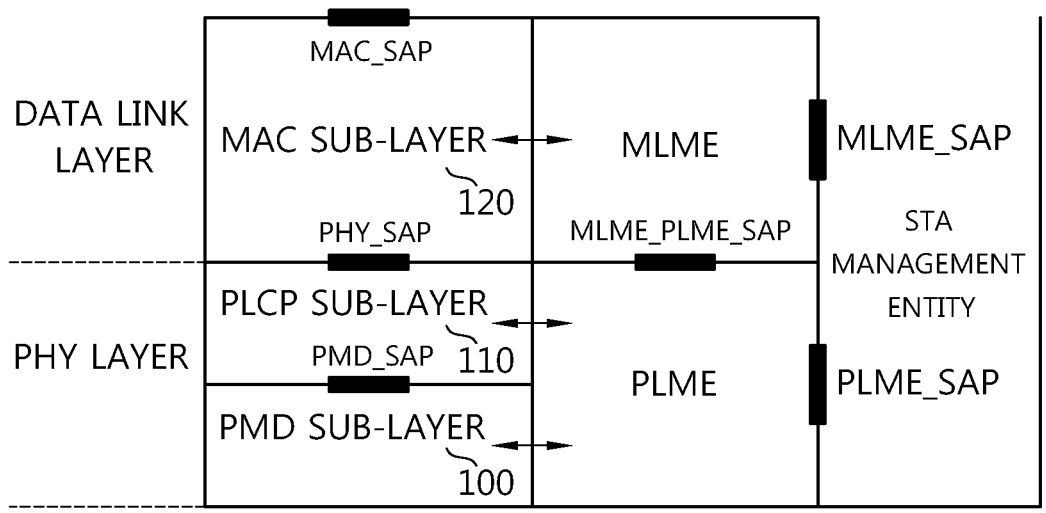
FIG. 1 shows a physical layer (PHY) architecture of the institute of electrical and electronics engineers (IEEE) 802.11.

FIG. 1 shows an IEEE 802.11 physical layer (PHY) architecture.

The IEEE 802.11 PHY architecture includes a PHY layer management entity (PLME), a physical layer convergence procedure (PLCP) sub-layer 110, and a physical medium dependent (PMD) sub-layer 100. The PLME provides a PHY management function in cooperation with a MAC layer management entity (MLME). The PLCP sub-layer 110 located between a MAC sub-layer 120 and the PMD sub-layer 100 delivers to the PMD sub-layer 100 a MAC protocol data unit (MPDU) received from the MAC sub-layer 120 under the instruction of the MAC layer, or delivers to the MAC sub-layer 120 a frame received from the PMD sub-layer 100. The PMD sub-layer 100 is a lower layer of the PDCP sub-layer and serves to enable transmission and reception of a PHY entity between two STAs through a radio medium. The MPDU delivered by the MAC sub-layer 120 is referred to as a physical service data unit (PSDU) in the PLCP sub-layer 110. Although the MPDU is similar to the PSDU, when an aggregated MPDU (A-MPDU) in which a plurality of MPDUs are aggregated is delivered, individual MPDUs and PSDUs may be different from each other.

The PLCP sub-layer 110 attaches an additional field including information required by a PHY transceiver to the MPDU in a process of receiving the MPDU from the MAC sub-layer 120 and delivering a PSDU to the PMD sub-layer 100. The additional field attached in this case may be a PLCP preamble, a PLCP header, tail bits required on a data field, etc. The PLCP preamble serves to allow a receiver to prepare a synchronization function and antenna diversity before the PSDU is transmitted. The PLCP header includes a field that contains information on a PLCP protocol data unit (PDU) to be transmitted, which will be described below in greater detail with reference to FIG. 2.

The PLCP sub-layer 110 generates a PLCP protocol data unit (PPDU) by attaching the aforementioned field to the PSDU and transmits the generated PPDU to a reception STA via the PMD sub-layer. The reception STA receives the PPDU, acquires information required for data recovery from the PLCP preamble and the PLCP header, and recovers the data.

Figure 2:
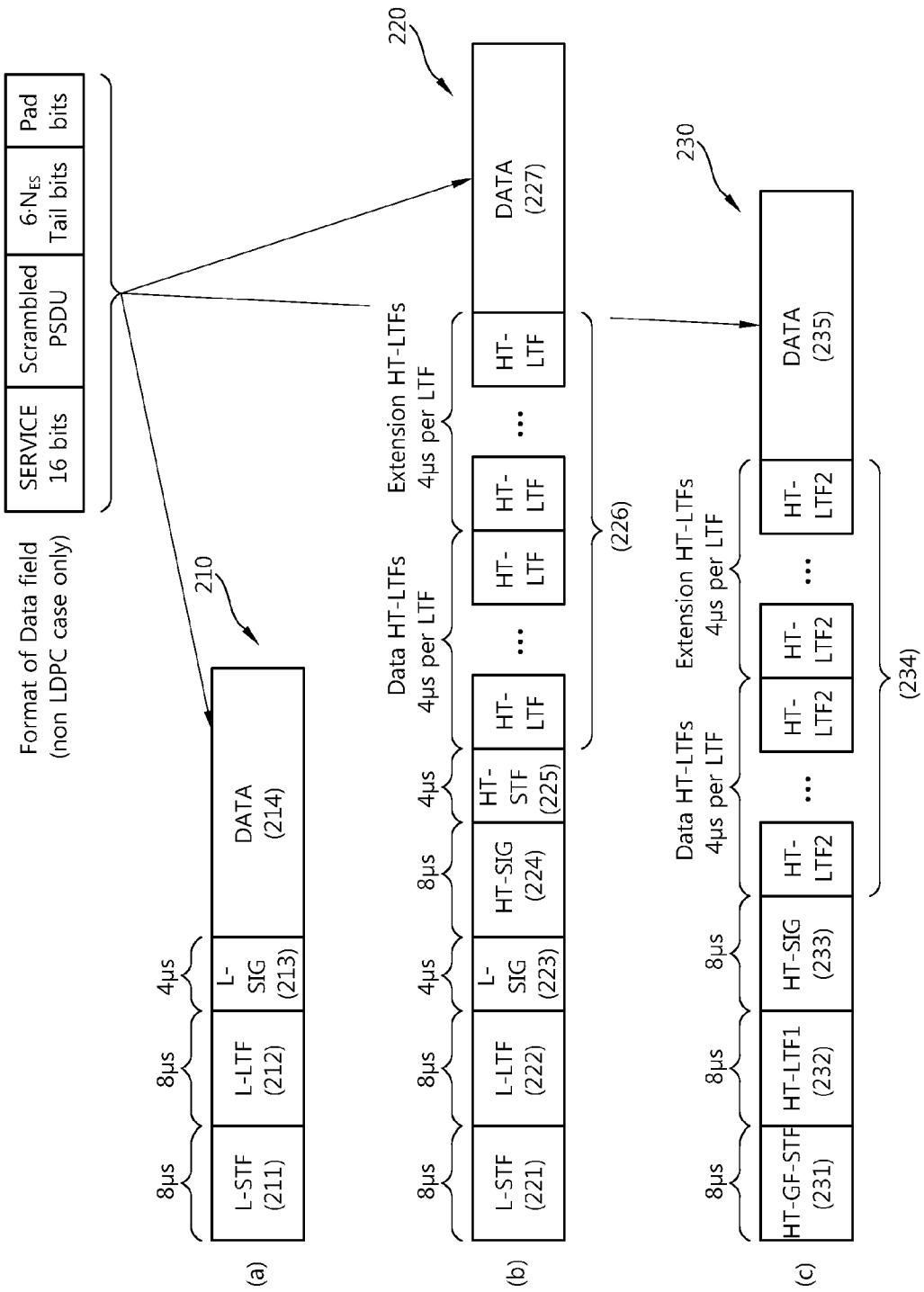
FIG. 2 is a diagram showing an example of a physical layer convergence procedure (PLCP) protocol data unit (PPDU) format used in a wireless local area network (WLAN) system based on the IEEE 802.11n standard.

FIG. 2 is a diagram showing an example of a PPDU format used in a WLAN system based on the IEEE 802.11n standard.

Referring to FIG. 2, there are three types of PPDUs supported in IEEE 802.11n.

FIG. 2(a) shows a legacy PPDU (L-PPDU) format for a PPDU used in the existing IEEE 802.11a/b/g. Therefore, an L-STA can transmit and receive an L-PPDU having this format in a WLAN system based on the IEEE 802.11n standard.

An L-PPDU 210 includes an L-STF field 211, an L-LTF field 212, an L-SIG field 213, and a data field 214.

The L-STF field 211 is used for frame timing acquisition, automatic gain control (AGC) convergence, coarse frequency acquisition, etc.

The L-LTF field 212 is used for frequency offset and channel estimation.

The L-SIG field 213 includes control information for demodulation and decoding of the data field 214.

The L-PPDU may be transmitted in the order of the L-STF field 211, the L-LTF field 212, the L-SIG field 213, and the data field 214.

FIG. 2(b) is a diagram showing an HT-mixed PPDU format in which an L-STA and an HT-STA can coexist. An HT-mixed PPDU 220 includes an L-STF field 221, an L-LTF field 222, an L-SIG field 223, an HT-SIG field 224, an HT-STF field 225, a plurality of HT-LTF fields 226, and a data field 227.

The L-STF field 221, the L-LTF field 222, and the L-SIG field 223 are identical to those shown in FIG. 2(a). Therefore, the L-STA can interpret the data field by using the L-STF field 221, the L-LTF field 222, and the L-SIG field 223 even if the HT-mixed PPDU 220 is received. The L-LTF field 222 may further include information for channel estimation to be performed by the HT-STA in order to receive the HT-mixed PPDU 220 and to interpret the L-SIG field 223, the HT-SIG field 224, and the HT-STF field 225.

The HT-STA can know that the HT-mixed PPDU 220 is a PPDU dedicated to the HT-STA by using the HT-SIG field 224 located next to the L-SIG field 223, and thus can demodulate and decode the data field 227.

The HT-STF field 225 may be used for frame timing synchronization, AGC convergence, etc., for the HT-STA.

The HT-LTF field 226 may be used for channel estimation for demodulation of the data field 227. Since the IEEE 802.11n supports single user-MIMO (SU-MIMO), a plurality of the HT-LTF fields 226 may be configured for channel estimation for each of data fields transmitted through a plurality of spatial streams.

The HT-LTF field 226 may consist of a data HT-LTF used for channel estimation for a spatial stream and an extension HT-LTF additionally used for full channel sounding. Therefore, the number of the plurality of HT-LTF fields 226 may be equal to or greater than the number of spatial streams to be transmitted.

The L-STF field 221, the L-LTF field 222, and the L-SIG field 223 are transmitted first so that the L-STA also can acquire data by receiving the HT-mixed PPDU 220. Thereafter, the HT-SIG field 224 is transmitted for demodulation and decoding of data transmitted for the HT-STA.

Up to fields located before the HT-SIG field 224, transmission is performed without beamforming so that the L-STA and the HT-STA can acquire data by receiving a corresponding PPDU. In the subsequent fields, i.e., the HT-STF field 225, the HT-LTF 226, and the data field 227, radio signal transmission is performed by using precoding. In this case, the HT-STF field 225 is transmitted so that an STA that receives a precoded signal can consider a varying part caused by the precoding, and thereafter the plurality of HT-LTF fields 226 and the data field 227 are transmitted.

Even if an HT-STA that uses 20 MHz in an HT WLAN system uses 52 data subcarriers per OFDM symbol, an L-STA that also uses 20 MHz uses 48 data subcarriers per OFDM symbol. Since the HT-SIG field 224 is decoded by using the L-LTF field 222 in a format of the HT-mixed PPDU 220 to support backward compatibility, the HT-SIG field 224 consists of 48×2 data subcarriers. The HT-STF field 225 and the HT-LTF 226 consist of 52 data subcarriers per OFDM symbol. As a result, the HT-SIG field 224 is supported using ½ binary phase shift keying (BPSK), each HT-SIG field 224 consists of 24 bits, and thus 48 bits are transmitted in total. That is, channel estimation for the L-SIG field 223 and the HT-SIG field 224 is performed using the L-LTF field 222, and a bit sequence constituting the L-LTF field 222 can be expressed by Equation 1 below. The L-LTF field 222 consists of 48 data subcarriers per one symbol, except for a DC subcarrier.

$$L_{-26,26} = \{1,1,-1,-1,1,1,-1,1,-1,1,1,1,1,1,1,-1,-1,1,1,\\ 1,-1,1,-1,1,1,1,1,0,1,-1,-1,1,1,-1,1,1,-1,1,-\\ 1,-1,-1,-1,1,1,-1,-1,1,1,-1,1,-1,1,1,1,1,1\} \quad \text{[Equation 1]}$$

FIG. 2(c) is a diagram showing a format of an HT-Greenfield PPDU 230 that can be used by only an HT-STA. The HT-GF PPDU 230 includes an HT-GF-STF field 231, an HT-LTF1 field 232, an HT-SIG field 233, a plurality of HT-LTF2 fields 234, and a data field 235.

The HT-GF-STF field 231 is used for frame timing acquisition and AGC.

The HT-LTF1 field 232 is used for channel estimation.

The HT-SIG field 233 is used for demodulation and decoding of the data field 235.

The HT-LTF2 234 is used for channel estimation for demodulation of the data field 235. Since the HT-STA uses SU-MIMO, channel estimation is required for each of data fields transmitted through a plurality of spatial streams, and thus a plurality of HT-LTF2 fields 234 may be configured.

The plurality of HT-LTF2 fields 234 may consist of a plurality of data HT-LTFs and a plurality of extension HT-LTFs, similarly to the HT-LTF 226 of the HT-mixed PPDU 220.

Each of the data fields 214, 227, and 235 respectively shown in FIGS. 2(a), (b), and (c) may include a service field, a scrambled PSDU field, a tail bits field, and a padding bits field.

In order to use MIMO in a WLAN system supporting an HT, an HT-LTF is defined for channel estimation. The HT-LTF is used for channel estimation similarly to an L-LTF, but has a difference in that the HT-LTF can estimate a MIMO channel. In order to estimate the MIMO channel by using the HT-LTF, an orthogonal mapping matrix $P_{HTLTF}$ is used by being multiplied by the HT-LTF. The $P_{HTLTF}$ consists of '1' and '−1' and can be expressed by Equation 2 below.

$$P_{HTLTF} = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad \text{[Equation 2]}$$

Herein, the orthogonal mapping matrix is used in a different size according to a channel layer, which will be described with reference to FIG. 3.

Figure 3:
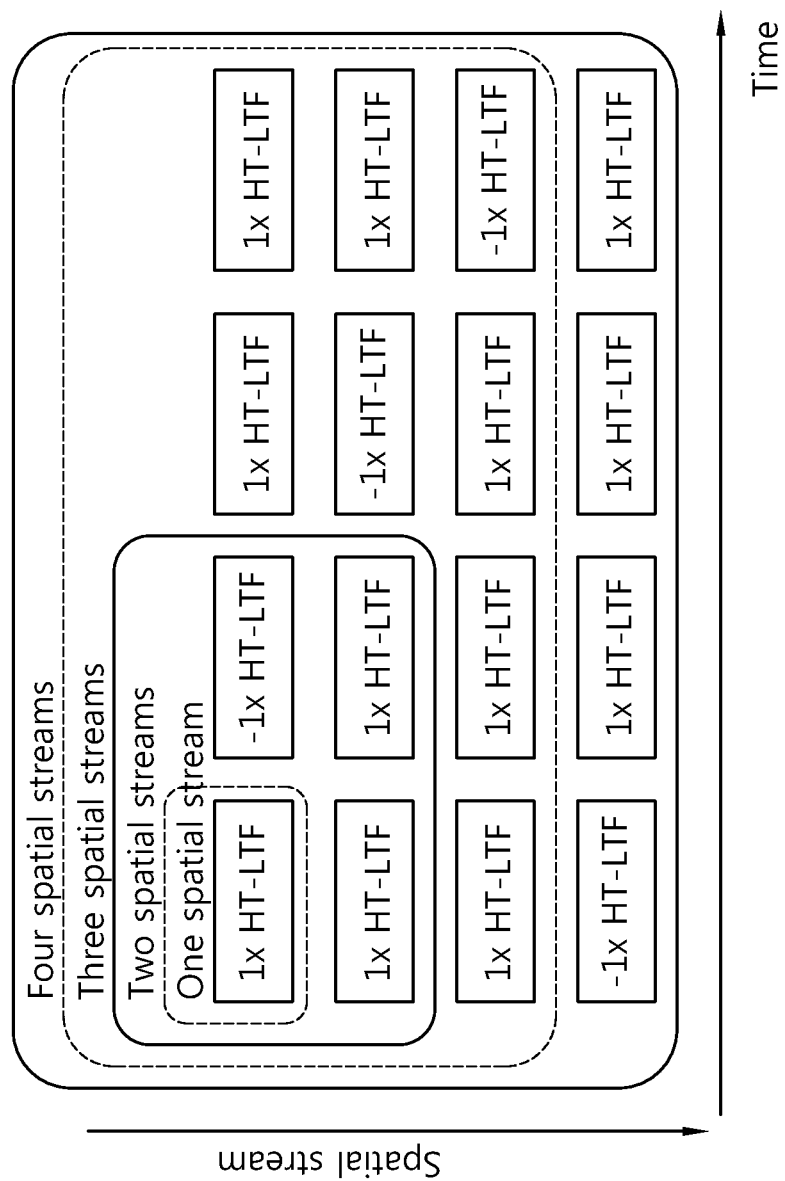
FIG. 3 shows an orthogonal mapping matrix based on a channel layer.

FIG. 3 shows an orthogonal mapping matrix based on a channel layer.

Referring to FIG. 3, a training symbol is defined on a spatial stream basis, and is transmitted for channel estimation of each spatial stream. When the number of spatial streams is 1, 2, and 4, the number of HT-LTFs to be transmitted is 1, 2, and 4, respectively. When the number of spatial streams is 3, one extra long training symbol is used so that 4 HT-LTFs can be used.

For SU-MIMO supported in the HT WLAN system, channel information between a transmitter and a receiver needs to be known to an AP and/or an STA which intend to transmit and receive a PPDU by using a MIMO transmission method. In order to report the channel information, the transmitter may perform channel estimation. The channel estimation can be performed based on training symbols of a physical layer convergence procedure (PLCP) preamble of a sounding PPDU. More specifically, the channel estimation can be performed based on the HT-LTF 226 shown in FIG. 2(b). The HT-LTF used in the channel estimation may be determined by the total number of antennas of the receiver or the number of spatial streams to be transmitted.

An HT-mixed PPDU format is a PPDU format for supporting a high throughput (HT) in a WLAN system in which a legacy STA and an HT-STA coexist. L-STF, L-LTF, and L-SIG fields are transmitted first so that an HT-mixed PPDU is also received by the legacy STA to obtain data through decoding and demodulation. Thereafter, an HT-SIG field is transmitted for transmission of information required to demodulation and decoding of data transmitted for an HT. Until the HT-SIG field, transmission is performed without beamforming so that various STAs including the legacy STA can receive this information. Regarding HT-LTF and data fields to be transmitted after the HT-SIG field, the HT-STF field is transmitted and then the HT-LTF and data fields are transmitted so as to be able to consider a part in which power varies by precoding.

As described above with reference to FIG. 2, the data field may include a service field, a PSDU, a tail bit field, and a padding bit field. Since the PPDU is transmitted by matching a specific number of bit sequences to a plurality of OFDM symbols, a bit-stream size of the PPDU may be determined according to a specific rule. For this, the PPDU is generated by being appended with a padding bit sequence according to a specific padding rule. An example of applying the padding rule will be explained with reference to FIG. 4 showing the HT-mixed PPDU format.

Figure 4:
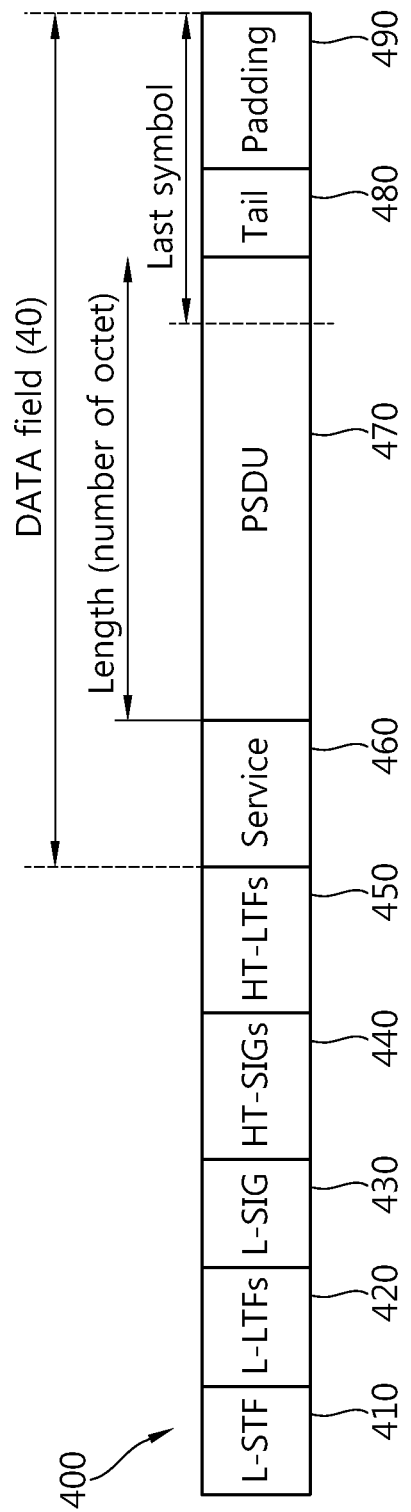
FIG. 4 shows an example of a high throughput (HT)-mixed PPDU format.

FIG. 4 shows an example of an HT-mixed PPDU format.

Referring to FIG. 4, an HT-mixed PPDU 400 includes an L-STF field 410, an L-LTF field 420, an L-SIG field 430, an HT-SIG field 440, an HT-LTF field 450, a service field 460, a PSDU field 470, a tail field 480, and a padding field 490. Since the L-STF field 410, the L-LTF field 420, the L-SIG field 430, the HT-SIG field 440, and the HT-LTF field 450 are the same as those in FIG. 2(b), detailed explanations thereof will be omitted.

The service field 460 is used to initialize a scrambler. 16 bits may be allocated for the service field.

The tail field 480 may be configured with a bit sequence required to return a convolution encoder to a state '0'. A bit size allocated to the tail field may be in proportion to the number of binary convolutional code (BCC) encoders used to encode data to be transmitted. More particularly, the bit size allocated to the tail field may be 6 bits×the number of BCC encoders.

The PSDU 470 may be a MAC protocol data unit (MPDU) or aggregate MPDU (A-MPDU) which is a data unit delivered from a MAC layer. A size of a bit sequence constituting the PSDU may be expressed by a value of a length sub-field included in the HT-SIG field 440. The size of the bit sequence of the PSDU may be expressed on an octet basis.

The padding field 490 consists of bits for filling a bit space which remains when a bit size to be allocated for each OFDM is not satisfied even if bits constituting the PSDU and a bit constituting the tail field are included in a last symbol among a plurality of OFDM symbols transmitted by allocating the PPDU 400. A method of configuring the padding field will be described in greater detail with reference to Equation 3 below.

$$N_{SYM} = \left\lceil \frac{(8 \times \text{length(of the } PSDU \text{ in } SIG \text{ field)} + 16 + 6 \times N_{BS}}{N_{DBPS}} \right\rceil \quad \text{[Equation 3]}$$

Herein, $N_{SYM}$ denotes a data field 40, i.e., the number of OFDM symbols used to transmit a bit stream constituting the service field 460, the PSDU 470, the tail field 480, and the padding field 490 to a receiving-end STA, $N_{ES}$ denotes the number of BCC encoders for the data field 40, and $N_{DBPS}$ denotes the number of data bits allocated for each OFDM symbol. And, $\lceil x \rceil$ denotes the smallest integer greater than or equal to x.

The number '16' in the numerator of Equation 3 denotes the number of bits allocated to the service field 460. $6 \times N_{ES}$ denotes the number of bits allocated to the tail field 480. $N_{DBPS}$ may refer to Table 1 and Table 2 below. In Table 1, the number of spatial streams is 1. In Table 2, the number of spatial streams is 2.

TABLE 1

| MCS Index | Modulation | R | $N_{BPSCS}(i_{SS})$ | $N_{SD}$ | $N_{SP}$ | $N_{CBPS}$ | $N_{DBPS}$ | Data rate (Mb/s) 800 ns GI | 400 ns GI (see NOTE) |
|---|---|---|---|---|---|---|---|---|---|
| 0 | BPSK | 1/2 | 1 | 52 | 4 | 52 | 26 | 6.5 | 7.2 |
| 1 | QPSK | 1/2 | 2 | 52 | 4 | 104 | 52 | 13.0 | 14.4 |
| 2 | QPSK | 3/4 | 2 | 52 | 4 | 104 | 78 | 19.5 | 21.7 |
| 3 | 16-QAM | 1/2 | 4 | 52 | 4 | 208 | 104 | 26.0 | 28.9 |
| 4 | 16-QAM | 3/4 | 4 | 52 | 4 | 208 | 156 | 39.0 | 43.3 |
| 5 | 64-QAM | 2/3 | 6 | 52 | 4 | 312 | 208 | 52.0 | 57.8 |
| 6 | 64-QAM | 3/4 | 6 | 52 | 4 | 312 | 234 | 58.5 | 65.0 |
| 7 | 64-QAM | 5/6 | 6 | 52 | 4 | 312 | 260 | 65.0 | 72.2 |

NOTE-
Support of 400 ns GI is optional on transmit and receive.

TABLE 2

| MCS Index | Modulation | R | $N_{BPSCS}(i_{SS})$ | $N_{SD}$ | $N_{SP}$ | $N_{CBPS}$ | $N_{DBPS}$ | Data rate (Mb/s) 800 ns GI | 400 ns GI (see NOTE) |
|---|---|---|---|---|---|---|---|---|---|
| 8 | BPSK | 1/2 | 1 | 52 | 4 | 104 | 52 | 13.0 | 14.4 |
| 9 | QPSK | 1/2 | 2 | 52 | 4 | 208 | 104 | 26.0 | 28.9 |
| 10 | QPSK | 3/4 | 2 | 52 | 4 | 208 | 156 | 39.0 | 43.3 |
| 11 | 16-QAM | 1/2 | 4 | 52 | 4 | 416 | 208 | 52.0 | 57.8 |
| 12 | 16-QAM | 3/4 | 4 | 52 | 4 | 416 | 312 | 78.0 | 86.7 |
| 13 | 64-QAM | 2/3 | 6 | 52 | 4 | 624 | 416 | 104.0 | 115.6 |
| 14 | 64-QAM | 3/4 | 6 | 52 | 4 | 624 | 468 | 117.0 | 130.0 |
| 15 | 64-QAM | 5/6 | 6 | 52 | 4 | 624 | 520 | 130.0 | 144.4 |

NOTE-
The 400 ns GI rate values are rounded to 1 decimal place.

Each symbol shown in Table 1 and Table 2 above may refer to Table 3 below.

TABLE 3

| Symbol | Explanation |
|---|---|
| $N_{SS}$ | Number of spatial streams |
| R | Coding rate |
| $N_{BPSC}$ | Number of coded bits per single carrier (total across spatial streams) |
| $N_{BPSCS}(i_{SS})$ | Number of coded bits per single carrier for each spatial stream, $i_{SS} = 1, \ldots, N_{SS}$ |
| $N_{SD}$ | Number of complex data numbers per spatial stream per OFDM symbol |
| $N_{SP}$ | Number of pilot values per OFDM symbol |
| $N_{CBPS}$ | Number of coded bits per OFDM symbol |
| $N_{DBPS}$ | Number of data bits per OFDM symbol |
| $N_{ES}$ | Number of BCC encoders for the DATA field |
| $N_{TBPS}$ | Total bits per subcarrier |

As can be seen in Table 1 to Table 2, $N_{DBPS}$ may have a value that satisfies Equation 4 below.

$$N_{DBPS} = N_{SD} \times \text{Mod} \times \text{code rate} \times N_{SS} \quad \text{[Equation 4]}$$

According to Equations 3 and 4, the number of padding bits constituting the padding field 490 filled to a last OFDM symbol can be calculated, which can be expressed by Equation 5 below.

$$N_{PAD} = N_{SYM} \times N_{DBPS} - (8 \times \text{length} + 16 + 6 \times N_{BS}) \quad \text{[Equation 5]}$$

By using the aforementioned method of determining the padding bit(s) to be appended, a PPDU format usable in the HT WLAN system can be completed. In the above equation, the term 'length' denotes a length of the PSDU.

Unlike the IEEE 802.11n standard supporting the HT, a next generation WLAN system requires a higher throughput. This is called a very high throughput (VHT) to distinguish it from the HT, and 80 MHz bandwidth transmission and/or higher bandwidth transmission (e.g., 160 MHz) are supported in the next generation WLAN system. In addition, multi user-multiple input multiple output (MU-MIMO) transmission is supported.

An amount of control information transmitted to STAs for MU-MIMO transmission may be relatively greater than an amount of IEEE 802.11n control information. Examples of control information additionally required for the next generation WLAN system may be information indicating the number of spatial streams to be received by each STA, information regarding modulation and coding of data transmitted to each STA, etc. Therefore, when MU-MIMO transmission is performed in order to provide data services simultaneously to a plurality of STAs, the amount of control information to be transmitted may be increased according to the number of receiving STAs.

In order to effectively transmit the increased amount of control information to be transmitted, among a plurality of pieces of control information required for MU-MIMO transmission, common control information commonly required to all STAs and dedicated control information individually required to the STAs may be transmitted by distinguishing the two types of information.

A PPDU format used in the WLAN system supporting MU-MIMO will be described with reference to FIG. 5.

Figure 5:
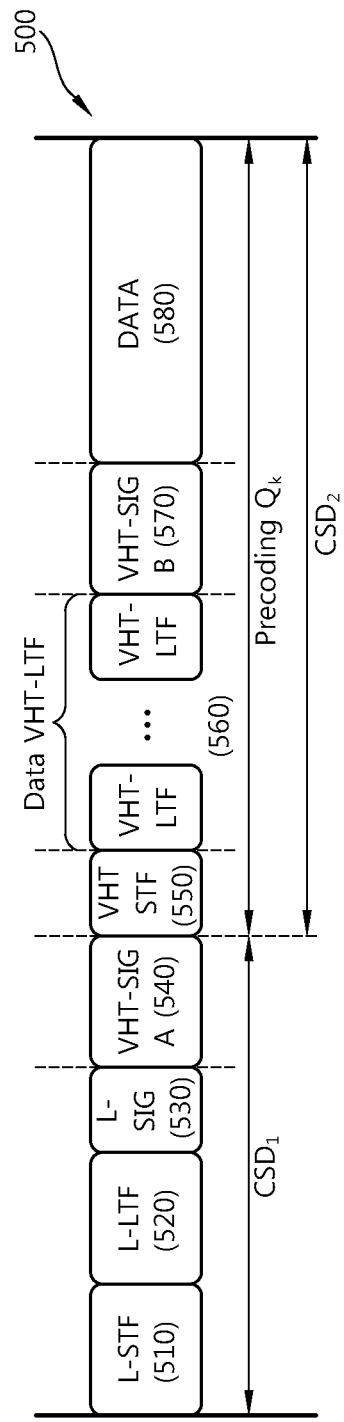
FIG. 5 shows an example of a PPDU format used in a next generation WLAN system.

FIG. 5 shows an example of a PPDU format used in a next generation WLAN system.

Referring to FIG. 5, a PPDU 500 includes an L-STF field 510, an L-LTF field 520, an L-SIG field 530, a VHT-SIGA field 540, a VHT-STF field 550, a VHT-LTF field 560, a VHT-SIGB field 570, and a data field 580.

A PLCP sub-layer converts a PSDU delivered from a MAC layer into the data field 580 by appending necessary information to the PSDU, generates the PPDU 500 by appending several fields such as the L-STF field 510, the L-LTF field 520, the L-SIG field 530, the VHT-SIGA field 540, the VHT-STF field 550, the VHT-LTF field 560, the VHT-SIGB field 570, or the like, and delivers the PPDU 500 to one or more STAs through a PMD layer.

The L-STF field 510 is used for frame timing acquisition, automatic gain control (AGC) convergence, coarse frequency acquisition, etc.

The L-LTF field 520 is used for channel estimation for demodulation of the L-SIG field 530 and the VHT-SIGA field 540.

The L-SIG field 530 is used when an L-STA receives the PPDU to acquire data.

The VHT-SIGA field 540 includes control information for interpreting the received PPDU 500 as common control information required for VHT-STAs which are MIMO-paired with an AP. The VHT-SIGA field 540 includes information on a spatial stream for each of the plurality of MIMO-paired STAs, bandwidth information, identification information related to whether space time block coding (STBC) is used, a group identifier for an STA group, information on an STA to which each group identifier is allocated, and information related to a short guard interval (GI). Herein, the group identifier for the STA group may include whether a currently used MIMO transmission method is MU-MIMO or SU-MIMO.

The VHT-STF field 550 is used to improve performance of AGC estimation in MIMO transmission.

The VHT-LTF field 560 is used when the STA estimates a MIMO channel. Since the VHT WLAN system supports MU- MIMO, the VHT-LTF field 560 can be configured by the number of spatial streams in which the PPDU 500 is transmitted. In addition, when full channel sounding is supported and is performed, the number of VHT-LTFs may increase.

The VHT-SIGB field 570 includes dedicated control information required when the plurality of MIMO-paired STAs receive the PPDU 500 to acquire data. Therefore, the STA may be designed such that the VHT-SIGB field 570 is decoded only when the common control information included in the VHT-SIGB field 570 indicates that the currently received PPDU 500 is transmitted using MU-MIMO transmission. On the contrary, the STA may be designed such that the VHT-SIGB field 570 is not decoded when the common control information indicates that the currently received PPDU 500 is for a single STA (including SU-MIMO).

The VHT-SIGB field 570 includes information on each STA's modulation, encoding, and rate-matching. A size of the VHT-SIGB field 570 may differ according to the MIMO transmission method (MU-MIMO or SU-MIMO) and a channel bandwidth used for PPDU transmission.

A term 'data block' can be used as a general expression for the depicted PPDU. In addition, in a data field included in the data block, a part transmitted to each of the MIMO-paired STAs can be expressed as a data unit.

In order for a next generation WLAN system supporting MU-MIMO to transmit the same-sized PPDU to the STAs paired with the AP, information indicating a bit size of the data field constituting the PPDU and/or information indicating a size of a bit-stream constituting a specific field in the specific field may be included in the VHT-SIGA field. However, a field required in the L-SIG field may be used for an effective PPDU format. That is, a length field and a rate field which are transmitted by being included in the L-SIG field may be used to provide necessary information so that the same-sized PPDU is transmitted to all STAs. In this case, additional padding may be required in a PHY layer since an MPDU and/or an A-MPDU are configured on a byte (or octet) basis in a MAC layer. Hereinafter, a padding method will be described in greater detail with reference to the accompanying drawings when the PPDU is generated in the PHY layer.

Figure 6:
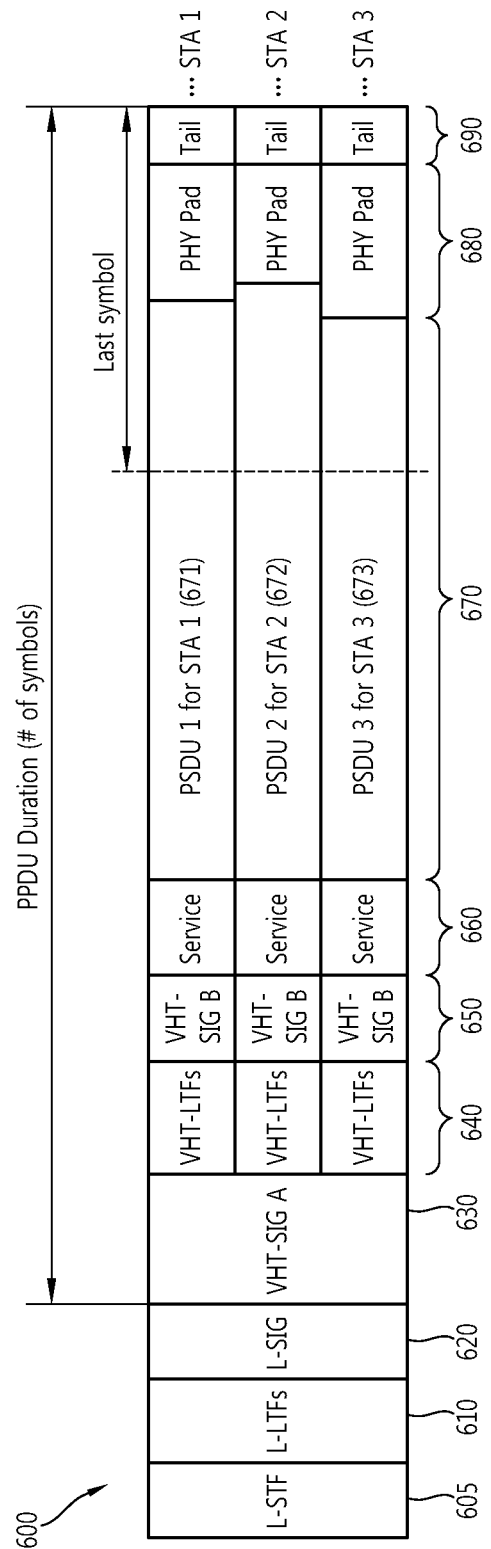
FIG. 6 shows a PPDU format according to an embodiment of the present invention.

FIG. 6 shows a PPDU format according to an embodiment of the present invention. Although it is shown in FIG. 6 that the number of STAs receiving a corresponding PPDU is limited to 3 and the number of spatial streams allocated to each STA is 1, there is no particular limitation on the number of STAs paired with an AP and the number of spatial streams allocated to each STA.

Referring to FIG. 6, a PPDU 600 includes an L-STF field 605, an L-LTF field 610, an L-SIG field 620, a VHT-SIGA field 630, a VHT-LTF field 640, a VHT-SIGB field 650, a service field 660, a PSDU 670, a padding field 680, and a tail field 690. The L-STF field 605, the L-LTF field 610, the L-SIG field 620, the VHT-SIGA field 630, the VHT-LTF field 640, and the VHT-SIGB field 650 are the same as those described above with reference to FIG. 5, and thus detailed descriptions thereof will be omitted. In addition, the PSDU 670 may be an MPDU and/or an A-MPDU which are delivered from a MAC layer. A PSDU1 671 intended to be transmitted to an STA1, a PSDU2 intended to be transmitted to an STA2, and a PSDU3 673 intended to be transmitted to an STA3 may have different bit sizes as illustrated.

In FIG. 6, the number of OFDM symbols required for transmission of data to each of a plurality of target STAs on the basis of MU-MIMO transmission is indicated by a PPDU duration $N_{SYM}$. Referring the figure, all PPDU durations corresponding to each of the plurality of target STAs are same. The PPDU duration can be optionally re-defined as the number of OFDM symbols required to transmit a data field. In that case, all the number of OFDM symbols for the data fields intended to be transmitted to each of the plurality of target STAs are same. However, the PPDU duration used in FIG. 6 will be used in the present invention.

Information indicating the PPDU duration may be included in the L-SIG field 620. In the PPDU, the PPDU duration indicated by the L-SIG field includes a symbol to which the VHT-SIGA field is allocated, a symbol to which the VHT-LTF field is allocated, a symbol to which the VHT-SIGB field is allocated, a bit (or bits) constituting the service field, bits constituting a PSDU, bits constituting the tail field, and bits constituting the padding field. A STA that receives a PPDU can acquire information about PPDU duration of the PPDU through the information indicating the PPDU duration included in the L-SIG field.

In this case, a transmitting-end AP and/or STA for generating a PPDU and transmitting the PPDU to a receiving-end STA may know information on the number $N_{SYM}$ of symbols corresponding the PPDU duration, the number $N_{VHT-SIGA}$ of symbols to which the VHT-SIGA field is allocated, the number $N_{VHT-LTFs}$ of symbols to which the VHT-LTF field is allocated, the number $N_{VHT-SIGB}$ of symbols to which the VHT-SIGB field is allocated, 16 bits constituting the service field, and the number of bits constituting the tail field. On the basis of this information, a PSDU to be allocated to an STAi and the number $N_{VHT-PSDU+Pad,i}$ of bits to be allocated to the padding field to be appended the PSDU can be known. This can be expressed by Equation 6 below.

$$N_{VHT-PSDU+Pad,i} = \underbrace{(N_{VHT-SYM} - N_{VHT-SIGA} - N_{VHT-LTFs} - N_{VHT-SIGB}) \times N_{DBPS,i}}_{term-1} - \underbrace{(16 + 6 \times N_{BS,i})}_{term-2}$$

$$= \underbrace{N_{DATAfield} \times N_{DBPS,i}}_{term-1} - \underbrace{(16 + 6 \times N_{BS,i})}_{term2}$$

[Equation 6]

$N_{VHT-PSDU+Pad,i}$ denotes the total number of bits obtained by appending the number of bits allocated to a PSDU to be transmitted to the STAi and the number of bits of the padding field. $N_{DATAfield}$ denotes the number of bits of the data field. Since the MPDU and/or the A-MPDU are padded on an octet (or byte) basis, the number of bits of the PSDU (i.e., PSDU1, PSDU2, and PSUD3) may be a multiple of 8. Therefore, if a PSDU length (on an octet basis) can be known, the number of bits allocated to the PSDU can be known. The number $N_{Pad}$ of padding bits allocated to the padding field can be expressed by Equation 7 below.

$$N_{Pad,i} = N_{DATAfield} \times N_{DBPS,i} - N_{VHT-PSDU,i} - (16 + 6 \times N_{BS,i})$$

$$= N_{DATAfield} \times N_{DBPS,i} - 8 \times \text{PSDU\_length}_i - (16 + 6 \times N_{BS,i})$$

[Equation 7]

The equation above shows that a bit size of the padding filed to be applied may vary depending on a length of the PSDU to be transmitted to each of the MU-MIMO paired STAs.

Referring to Equation 7, an AP and/or an STA which intend to generate a PPDU and transmit the PPDU to the plurality of MIMO-paired STAs can determine the bit size of the padding field if a value of $N_{DATAfield}$ can be known. In practice, the number of OFDM symbols required to transmit the PSDU to each of the MIMO-paired STAs may differ. This is because the value of $N_{DATAfield}$ can be determined based on the length of the PSDU intended to be transmitted to the STA. On the other hand, the number $N_{DATAfield}$ of OFDM symbols for the data field constituting the PPDU may be a specific number. Therefore, a transmitting-end AT and/or STA may determine the greatest value of the number $N_{DATAfield,i}$ of OFDM symbols required to transmit the PSDU to each of the MIMO-paired STAs as the number $N_{DATAfield}$ of OFDM symbols for the data field constituting the PPDU This can be expressed by Equation 8 below.

$$N_{DATAfield} = \max\{N_{DATAfield,i}\}_{i=1}^{k} \quad \text{[Equation 8]}$$

Herein, $N_{DATAfield,i}$ denotes the number of OFDM symbols required to transmit the PSDU to the STAi, and may be the number of OFDM symbols of the data field configured when generating a PPDU to be transmitted to the STAi by using SU-MIMO or single-antenna transmission. NDATAfield,i may be determined based on information about the length of PSDU included in TXVECTOR primitive(s). k denotes the total number of STAs which are MIMO-paired with the AP and/or the STA. Therefore, k may have an integer value.

In another method, $N_{VHT-PSDU+Pad}$ must be provided on a byte basis in order to support the PPDU format of FIG. 6. That is, a padding procedure performed in a PHY layer has to be performed on a last transmitted OFDM symbol. This may occur when the number of bits in the term-1 of Equation 6 above is not a multiple of 8. For example, assume that $N_{DBPS}$ can be used in an extended manner in the HT WLAN system. In this case, a possible $N_{DBPS}$ value is an even number, but a value which is not a multiple of 8 exists such as 26, 52, 78, 156, etc. $(N_{VHT-SYM}-N_{VHT-SIGA}-N_{VHT-LTFs}-N_{VHT-SIGB})$ must be an even number greater than or equal to 4. That is, if $(N_{VHT-SYM}-N_{VHT-SIGA}-N_{VHT-LTFs}-N_{VHT-SIGB})$ is an odd/primary number, the term-1 is not provided on a byte basis. In addition, in the term-2, there may also be a case where the tail field in which the number of allocated bits is based on a multiple of 6 is not a multiple of 8. In order to set the $N_{VHT-PSDU+Pad}$ to the multiple of 8 by considering the term-1 and the term-2, zero padding may be supported on a bit basis in the PHY layer. A detailed method of calculating the value $N_{VHT-PSDU+Pad}$ can be performed as shown in Equation 9 below.

$$N_{VHT-Pad} = (N_{VHT-PSDU+Pad}) \bmod 8 \quad \text{[Equation 9]}$$

According to Equation 9 above, the value $N_{VHT-PSDU+Pad}$ may be one of 0, 2, 4, and 6. This is because the value $N_{SD}$ has an even number in general and thus the value $N_{DBPS}$ is also an even number.

A method of determining a bit size of a padding bit to be appended to the aforementioned PPDU may be independently applied to each STA for receiving the PPDU to be subjected to beamforming and transmission. This is because a size of the tail field may differ from one STA to another since there is a difference in the number of spatial streams allocated to each of the MIMO-paired STAs, a bit size of data to be transmitted (i.e., a bit size of the PSDU), and the number of BCC encoders used for generation of the PPDU.

Figure 7:
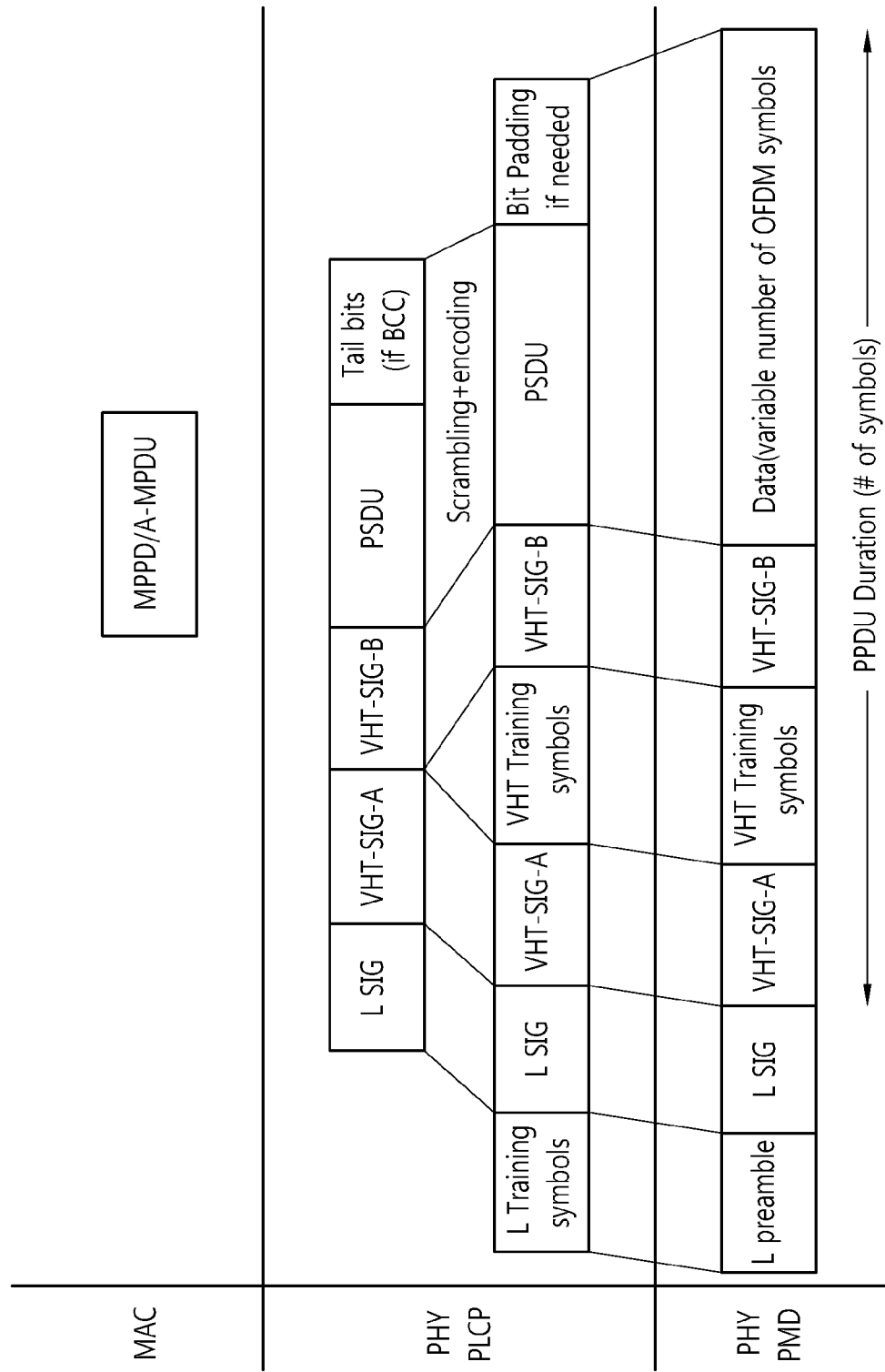
FIG. 7 shows an example of a transmission (Tx) procedure based on a PPDU generation method according to an embodiment of the present invention.

FIG. 7 shows an example of a transmission (Tx) procedure based on a PPDU generation method according to an embodiment of the present invention.

Referring to FIG. 7, a MAC layer delivers a generated MPDU or A-MPDU to a PLCP sub-layer. In the PLCP sub-layer, the MPDU or A-MPDU is called a PSDU. The PLCP sub-layer transmits the PSDU to a different STA through a PHY layer, and appends necessary control information so that the different STA receives the PPDU and acquires data by performing demodulation and decoding. The control information may be included in an L-SIG field, a VHT-SIGA field, and a VHT-SIGB field, and a tail field for indicating an encoder type (in case of a BCC encoder) may be additionally appended. The control information included in the VHT-SIGA field and VHT-SIGB field may be the control information mentioned above with reference to FIG. 5. The PLCP sub-layer may further append a training symbol for radio resource synchronization, timing acquisition, antenna diversity acquisition, or the like between a transmitting-end AP and/or STA and a receiving-end STA. This can be implemented by appending a legacy preamble including an L-STF and L-LTF for an L-STA, and a VHT-STF and VHT-LTF for a VHT-STA. A PPDU transmitted through a radio resource is transmitted by being mapped to an OFDM symbol. Herein, the PPDU mapped to the OFDM symbol and/or a data field included in the PPDU may be implemented to have a specific size, and can be implemented with a multiple of an octet number as described above. Therefore, in order to match to a bit size of the PPDU and/or data field, if the bit size is not sufficient, a padding bit may be appended to match to a total bit size of the PPDU and/or the data field. In this case, a detailed method of appending the padding bit can be implemented based on the embodiments of FIG. 5 to FIG. 7 and Equation 6 to equation 8. When the bit size of the PPDU and/or the data field is provided on an octet basis, a length of the padding field appended thereto may be 0 to 7 bits. The PPDU generated in the Tx procedure includes a preamble for the L-STA and VHT-STA, an L-SIG field including control information required for the L-STA, a VHT-SIG (i.e., VHT-SIGA and VHT-SIGB) field including control information required for the VHT-STA, and a data field including a service field, a PSDU field, and a tail field. The generated PPDU may be mapped to OFDM symbols, and then may be transmitted to at least one or more target STAs which are MIMO-paired.

Figure 8:
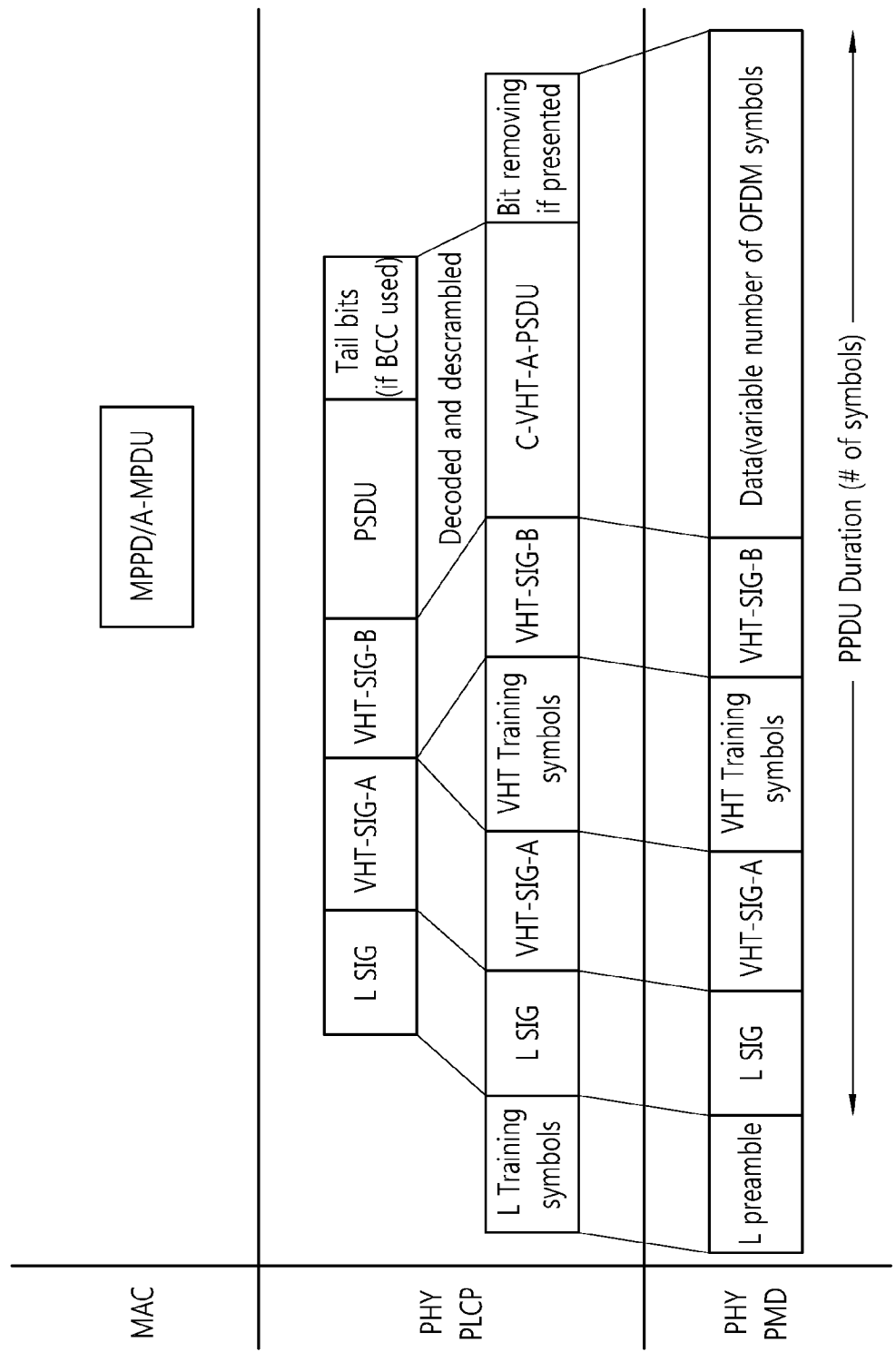
FIG. 8 shows an example of a reception (Rx) procedure for a generated PPDU according to an embodiment of the present invention.

FIG. 8 shows an example of a reception (Rx) procedure for a generated PPDU according to an embodiment of the present invention.

Referring to FIG. 8, upon receiving the PPDU, a receiving-end STA can evaluate a size of an appended padding bit according to the aforementioned equation. Therefore, a PHY layer of the receiving-end STA can determine whether there is a bit constituting a padding field included in a data field of the received PPDU, and if it exists, can delete the padding bit. Thereafter, the receiving-end STA can acquire the transmitted data by transmitting a PSDU to a MAC layer.

Figure 9:
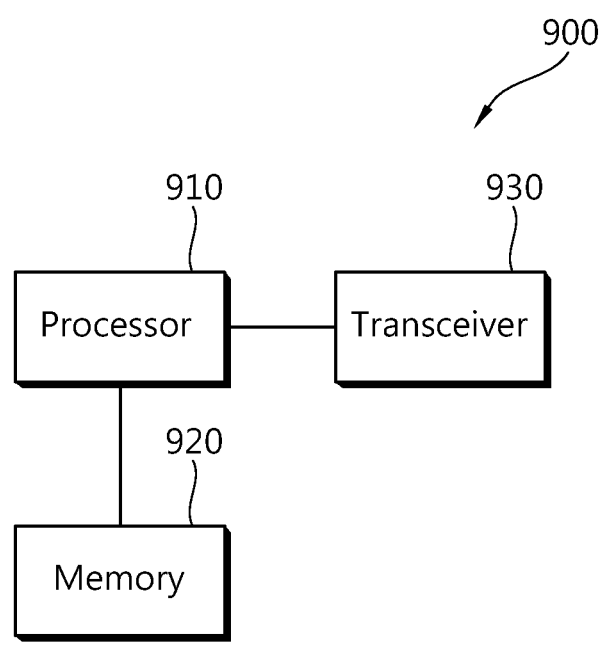
FIG. 9 is a block diagram showing a wireless apparatus for implementing an embodiment of the present invention.

FIG. 9 is a block diagram showing a wireless apparatus for implementing an embodiment of the present invention.

Referring to FIG. 9, a wireless apparatus 900 includes a processor 910, a memory 920, and a transceiver 930. The transceiver 930 transmits and/or receives a radio signal, and implements an IEEE 802.11 physical layer. The processor 910 is operationally coupled to the transceiver 930 and is configured to implement a MAC layer and/or PHY layer for implementing the embodiment of the present invention shown in FIG. 5 to FIG. 8 related to a PPDU generation method.

The processor 910 and/or the transceiver 930 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 920 and may be performed by the processor 910. The memory 920 may be located inside or outside the processor 910, and may be coupled to the processor 910 by using various well-known means.

A specific padding bit is appended to data intended to be transmitted to stations (STAs) paired using multi user-multiple input multiple output (MU-MIMO) so as to generate PPDUs having the same bit size. Accordingly, a plurality of pieces of different-sized data can be transmitted through the same number of orthogonal frequency division multiplexing (OFDM) symbols to each STA by using MU-MIMO transmission.

What is claimed is:

1. A method of transmitting data blocks in a wireless communication system, the method performed by a transmitter and comprising:

generating a data block in a Medium Access Control (MAC) layer;

generating a first padded data block by appending zero or more MAC padding bits to the data block;

delivering the first padded data block from the MAC layer to a physical (PHY) layer;

generating a second padded data block by appending zero or more PHY padding bits to the first padded data block in the PHY layer; and transmitting a PHY protocol data unit (PPDU) to a receiver, the PPDU including a Very High Throughput-Signal-A (VHT-SIG-A) field, a Very High Throughput-Signal-B (VHT-SIG-B) field and the second padded data block over an operating channel, wherein the VHT-SIG-A field includes group information indicating the receiver to receive the PPDU, wherein the VHT-SIG-B field includes information indicating a length of the data block before padding, and wherein a number of bits for the VHT-SIG-B field is determined based on a bandwidth of the operating channel.

2. The method of claim 1, wherein the VHT-SIG-A field further includes a bandwidth field indicating the bandwidth of the operating channel.

3. The method of claim 1, wherein the PPDU further includes a Very High Throughput-Short Training Field (VHT-STF) and a Very High Throughput-Long Training Field (VHT-LTF).

4. The method of claim 1, wherein a number of bits for the zero or more PHY padding bits is determined by:

$$N_{PAD}=\{N\text{sym}N_{DBPS}-8\text{PSDU}_{length}-(16+6N_{ES})\} \bmod 8$$

wherein:

$N_{PAD}$ indicates the number of bits for the zero or more physical padding bits and ranges from 0 to 7;

Nsym indicates a number of orthogonal frequency division multiplex (OFDM) symbols corresponding to the length of the first data block;

$N_{DBPS}$ indicates a number of data bits per symbol;

$\text{PSDU}_{length}$ indicates the length of the first data block;

$N_{ES}$ indicates a number of binary convolution coding (BCC) encoders, and

'mod' denotes modulo operation.

5. A device comprising:

a processor; and a transceiver operatively coupled to the processor and configured to transmit and receiving a data block, wherein the processor having a Medium Access Control (MAC) layer and a physical (PHY) layer is configured to:

generate a data block in a Medium Access Control (MAC) layer;

generate a first padded data block by appending zero or more MAC padding bits to the data block;

deliver the first padded data block from the MAC layer to a physical (PHY) layer;

generate a second padded data block by appending zero or more PHY padding bits to the first padded data block in the PHY layer; and instruct the transceiver to transmit a PHY protocol data unit (PPDU) to a receiver, the PPDU including a Very High Throughput-Signal-A (VHT-SIG-A) field, a Very High Throughput-Signal-B (VHT-SIG-B) field and the second padded data block over an operating channel, wherein the VHT-SIG-A field includes group information indicating the receiver to receive the PPDU, wherein the VHT-SIG-B field includes information indicating a length of the data block before padding, and wherein a number of bits for the VHT-SIG-B field is determined based on a bandwidth of the operating channel.

6. The device of claim 5, wherein the VHT-SIG-A field further includes a bandwidth field indicating the bandwidth of the operating channel.

7. The device of claim 5, wherein the PPDU further includes a Very High Throughput-Short Training Field (VHT-STF) and a Very High Throughput-Long Training Field (VHT-LTF).

8. The device of claim 5, wherein a number of bits for the zero or more PHY padding bits is determined by:

$$N_{PAD}=\{N\text{sym}N_{DBPS}-8\text{PSDU}_{length}-(16+6N_{ES})\} \bmod 8$$

wherein:

$N_{PAD}$ indicates the number of bits for the zero or more physical padding bits and ranges from 0 to 7;

Nsym indicates a number of orthogonal frequency division multiplex (OFDM) symbols corresponding to the length of the first data block;

$N_{DBPS}$ indicates a number of data bits per symbol;

$\text{PSDU}_{length}$ indicates the length of the first data block;

$N_{ES}$ indicates a number of binary convolution coding (BCC) encoders, and

'mod' denotes modulo operation.

* * * * *